United States Patent
Birecki et al.

(10) Patent No.: US 7,057,997 B2
(45) Date of Patent: Jun. 6, 2006

(54) CLASS OF ELECTRON BEAM BASED DATA STORAGE DEVICES AND METHODS OF USE THEREOF

(75) Inventors: Henryk Birecki, Palo Alto, CA (US); Huei-Pei Kuo, Cupertino, CA (US); Si-Ty Lam, Pleasanton, CA (US); Gary A. Gibson, Palo Alto, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 407 days.

(21) Appl. No.: 10/420,746

(22) Filed: Apr. 23, 2003

(65) Prior Publication Data
US 2004/0213127 A1   Oct. 28, 2004

(51) Int. Cl.
*G11B 7/00* (2006.01)

(52) U.S. Cl. ....................... 369/101; 369/126
(58) Field of Classification Search ............. None
See application file for complete search history.

(56) References Cited

U.S. PATENT DOCUMENTS

| | | | |
|---|---|---|---|
| 5,264,876 A | | 11/1993 | Kawade et al. |
| 5,751,686 A | * | 5/1998 | Kuroda et al. ............ 369/126 |
| 5,812,516 A | * | 9/1998 | Nose et al. ............... 369/126 |
| 6,477,132 B1 | * | 11/2002 | Azuma et al. ............ 369/126 |
| 6,507,552 B1 | * | 1/2003 | Gibson ..................... 369/126 |
| 6,542,400 B1 | * | 4/2003 | Chen et al. ............... 365/151 |
| 6,735,163 B1 | * | 5/2004 | Marshall .................. 369/126 |

FOREIGN PATENT DOCUMENTS

| | | |
|---|---|---|
| EP | 0714093 | 5/1996 |
| EP | 0871166 | 10/2002 |

* cited by examiner

*Primary Examiner*—Paul W. Huber

(57) ABSTRACT

An ultra-high-density data storage device that includes at least one energy beam emitter and a data storage medium that itself includes an organic material. The organic material may include one or more Langmuir-Blodgett layers and may include a conductive polymer. Localized presence or absence of localized disorder in the Langmuir-Blodgett layers may be used to detect data bits formed in the data storage medium. The presence or absence of one-dimensional conductivity in the organic material may also be used to read data bits formed in the data storage medium.

22 Claims, 5 Drawing Sheets

CLASS OF ELECTRON BEAM BASED DATA STORAGE DEVICES AND METHODS OF USE THEREOF

BACKGROUND

Data storage devices may be used in computers and other electronic equipment to store information in the form of data bits. Early data storage devices included computer punchcards in which the data consisted of holes with millimeter dimensions. The punch-cards were fed into a computer and the data on the punch cards was read. Today, the punch-cards have been replaced by semiconductor chips and the millimeter-sized holes have been replaced with much smaller data bits.

As the data bits keep getting smaller and smaller, the bits may be positioned closer and closer together and the density of the data stored on a data storage device can be increased. When the data bits are of micrometer, sub-micrometer, or nanometer dimensions, the data storage device may be referred to as an ultra-high-density data storage device.

FIG. 1 illustrates a perspective view of an ultra-high-density data storage device 10. The ultra-high-density data storage device 10 includes a set of field emitters 100, an inorganic data storage layer 110 that is located below the field emitters 100, a micromover 120 that holds the inorganic data storage layer 110 below the field emitters 100 and that can position the inorganic data storage layer 110 at desired locations relative to the field emitters 100, and electrical connections 130 that can supply energy to the field emitters 100. When supplied with energy, the field emitters 100 can bombard the inorganic data storage layer 110 with electron beams and can transform nanometer-scaled portions of the inorganic data storage layer 110 from unwritten data bits, designated in FIG. 1 by the reference numeral 140, to written data bits, designated by the reference numeral 150. This transformation occurs via a writing process that will be discussed below.

As mentioned above, when writing data to the inorganic data storage layer 110, selected field emitters 100 are energized, through the electrical connections 130, and are made to bombard selected unwritten data bits 140 with electron beams. During the writing process, the electron beams are of sufficient power density to transform the bombarded unwritten data bits 140 from a first material state (e.g., a crystalline state, which may be assigned a "0" value) to a second material state (e.g., an amorphous state, which may be assigned a "1" value), upon appropriate cooling. Hence, a data bit having a value of "1" can be written to and stored on the inorganic data storage layer 110 by bombarding a crystalline, unwritten data bit 140 and by appropriately cooling the unwritten data bit 140 to form an amorphous, written data bit 150.

When erasing data from the inorganic data storage layer 110, selected field emitters 100 are energized, through the electrical connections 130, and are made to bombard selected written data bits 150 with electron beams. During the erasing process, the electron beams are of sufficient power density to transform the bombarded written data bits 150 from a second material state (e.g., an amorphous state, which may be assigned a "1" value) to a first material state (e.g., a crystalline state, which may be assigned a "0" value) through the application of a heating pulse with an appropriate temporal and spatial profile. For example, a data bit having a value of "0" can be restored on the inorganic data storage layer 110 by bombarding an amorphous, written data bit 150 and by appropriately heating and annealing the written data bit 150 to form a crystalline, erased data bit 140.

When reading data from the storage layer 110, the field emitters 100 again bombard the data bits 140, 150 with electron beams. However, instead of bombarding the data bits 140, 150 with electron beams that have sufficient energy to transform the data bits 140, 150 between the first and second material states discussed above, the field emitters 100 bombard the data bits 140, 150 with relatively low-power-density electron beams that do not effectuate a transformation but that do effectuate identification. Then, the interactions between the low-power-density electron beams and the data bits 140, 150 are monitored in order to read data.

Differences in the interactions monitored during the reading operation occur because the low-power-density beams interact differently with unwritten data bits 140 than with written data bits 150. For example, a low-power-density beam may generate fewer secondary electrons when bombarding a crystalline, unwritten data bit 140 than when bombarding an amorphous, written data bit 150. Therefore, by monitoring the interactions between the relatively low-power-density beam and the data bit 140, 150 that the beam is bombarding (e.g., by monitoring the number of secondary electrons generated), it becomes possible to determine whether the bombarded data bit 140, 150 is storing a "1" or a "0" value and to read data stored in the data storage layer 110.

Many of the storage materials typically used in the storage medium 110 illustrated in FIG. 1, such as inorganic phase-change materials, require a substantial amount of energy to transform an unwritten data bit 140 into a written data bit 150, and vice versa. In addition, traditional storage media are typically deposited in vacuum equipment by processes like evaporation or sputtering. Hence, in order to conserve energy during the writing or erasing processes and simplify the manufacturing process, it would be preferable to find alternate storage materials that require lower transformation energy and can be processed without vacuum equipment. The disadvantages of the prior art are overcome by embodiments described herein.

SUMMARY

A data storage device that includes a first electrode and a second electrode, a storage medium positioned between the first electrode and the second electrode, wherein the storage medium includes an organic material, and an emitter positioned proximate to the storage medium, wherein the emitter is capable of emitting an energy beam with a sub-micrometer-scaled spot size on a surface of the storage medium.

A method of storing and retrieving data in a data storage device having a first electrode, a second electrode, a storage medium positioned between the first electrode and the second electrode and including an organic material, and an emitter positioned proximate to the storage medium and capable of emitting an energy beam with a sub-micrometer-scaled spot size on a surface of the storage medium. The method includes the step of writing to the storage medium or erasing existing data in the storage medium by bombarding the storage medium with a high-energy-density beam from the emitter, and the step of reading from the storage medium by bombarding the storage medium with a low-energy-density beam from the emitter.

DESCRIPTION OF THE DRAWINGS

The detailed description will refer to the following drawings, wherein like numerals refer to like elements, and wherein:

FIG. 2 is a cross-sectional view of an ultra-high density data storage device that includes an organic material in the storage medium and where the organic material has not been written to;

FIG. 3 is a cross-sectional view of an ultra-high density data storage device that includes an organic material in the storage medium and where the organic material has been written to;

DETAILED DESCRIPTION

As discussed above, data storage media that consist entirely of inorganic materials generally require a substantial amount of energy to have data bits written/formed therein. In order to reduce the amount of energy that is needed to write data bits to a data storage medium, it is possible to include an organic material in the data storage medium. The reduction in energy needed is generally associated with the lower bonding strengths of organic materials relative to inorganic materials.

Figure 1:
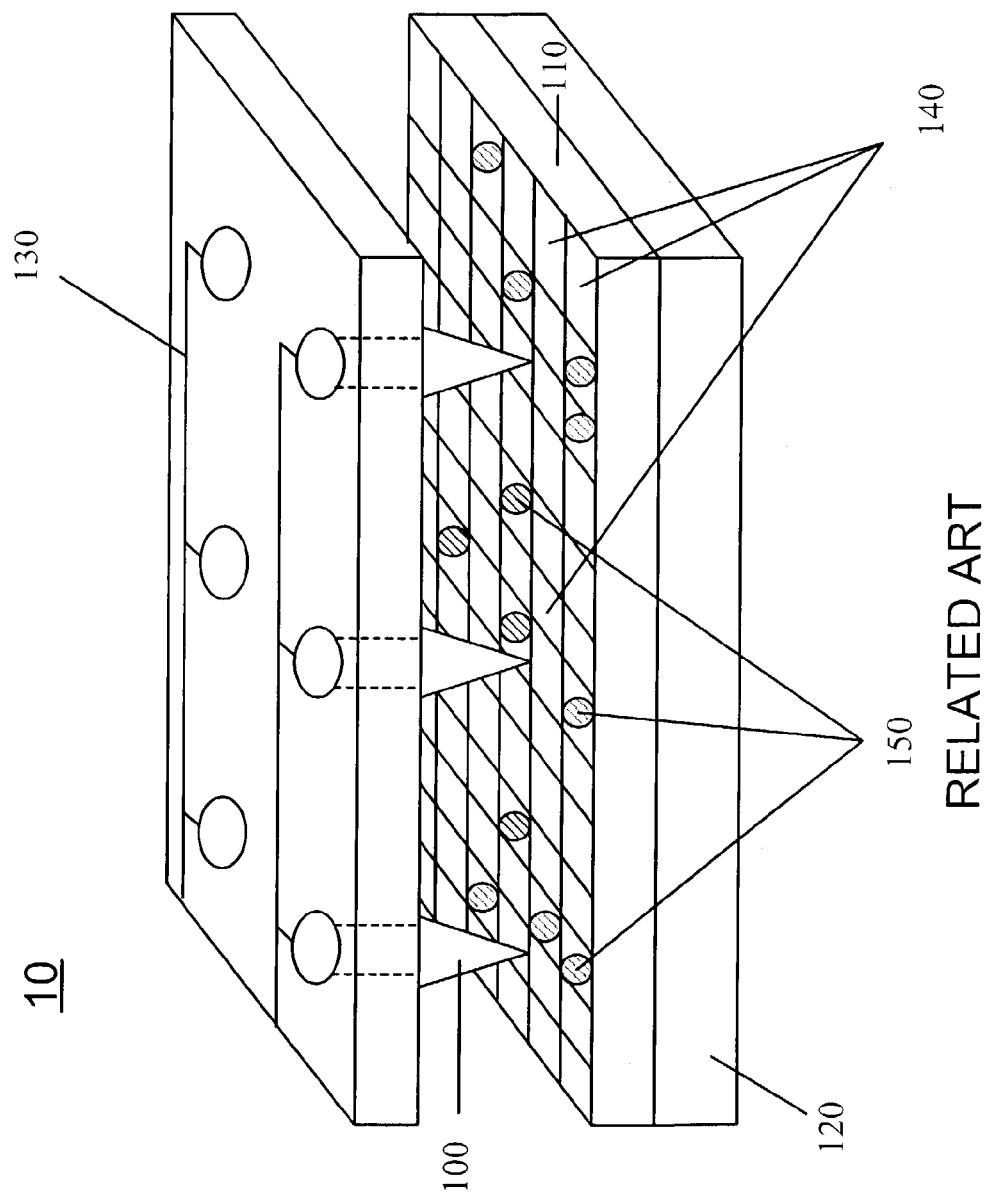
FIG. 1 shows a perspective view of an ultra-high density data storage device, according to the related art, that includes an inorganic material as the storage medium.
Figure 2:
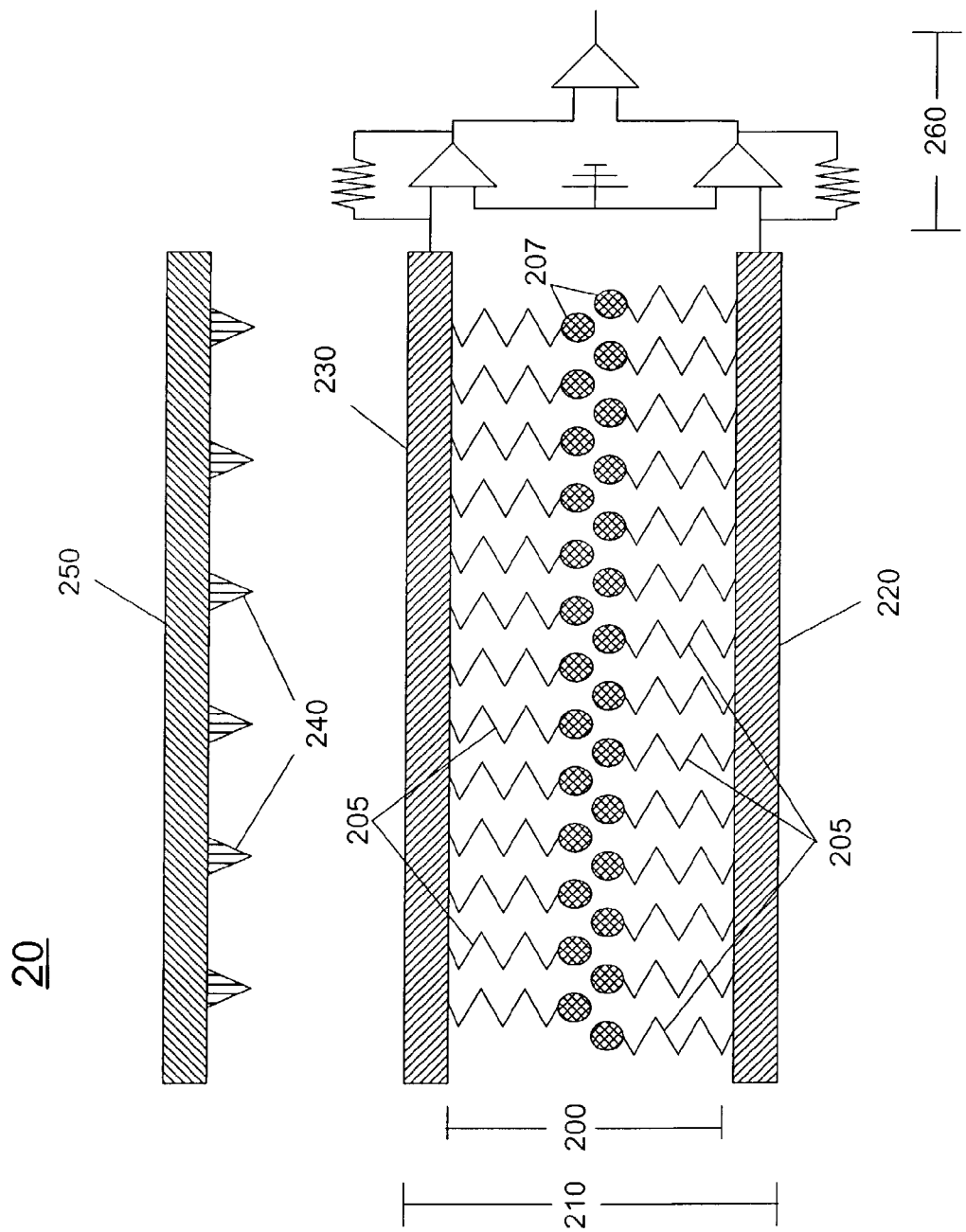
Figure 3:
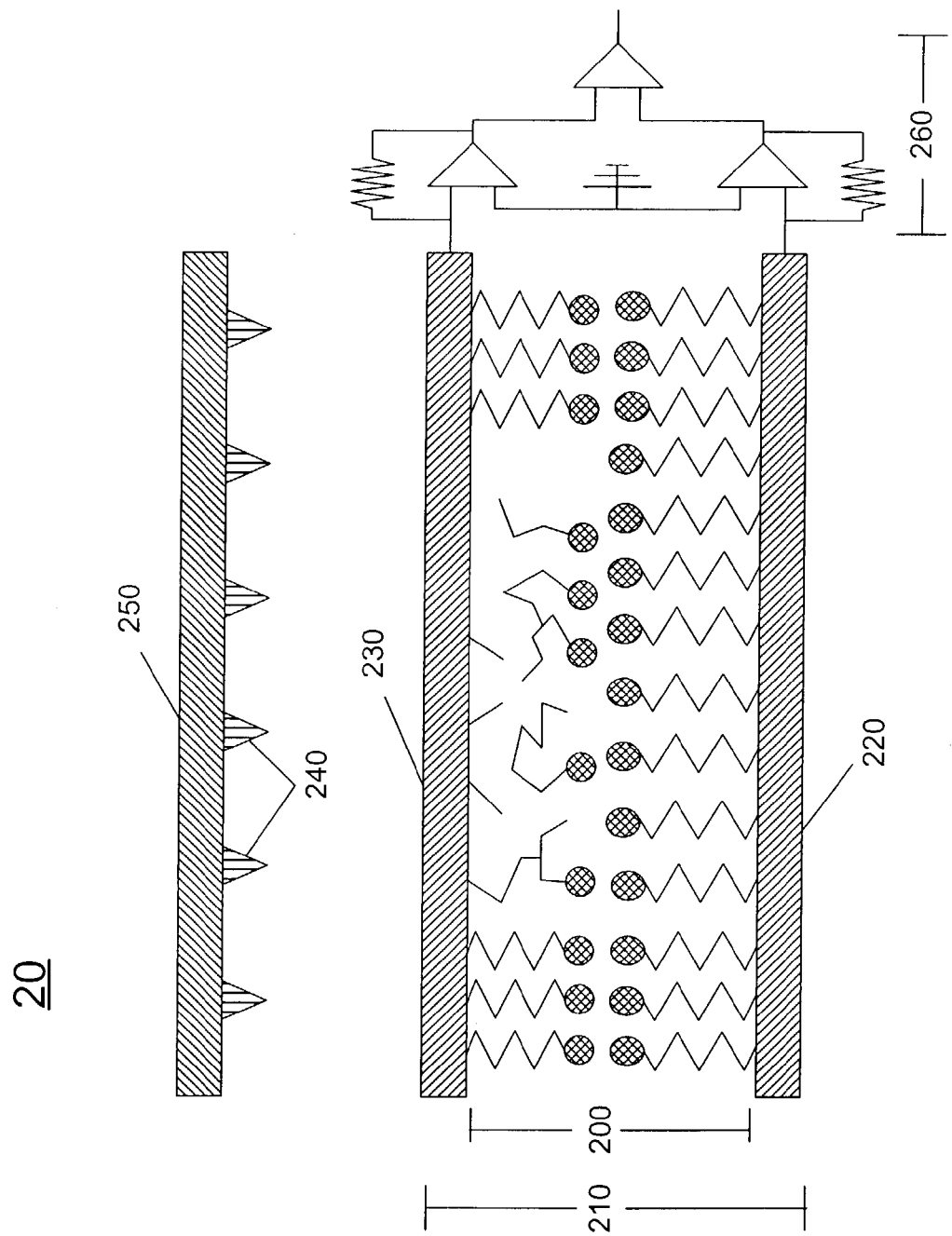

FIGS. 2 and 3 show cross-sectional views of an exemplary ultra-high-density data storage device 20 that includes an organic material 200 in a data storage medium 210. In FIG. 2, the entire organic material 200 has a substantially ordered structure and has not been written to. In FIG. 3, however, portions of the organic material 200 are disrupted or cross-linked, indicating that data bits have been written in the organic material 200.

The data storage medium 210 illustrated in FIGS. 2 and 3 includes a first electrode 220 and a second electrode 230. These electrodes 220, 230 are positioned on either side of the organic material 200. A series of emitters 240 are positioned proximate (i.e., within a few microns or less) to the storage medium 210, the second electrode 230 is positioned between the organic material 200 and the emitters 240, and the first electrode 220 is positioned below the organic material 200. Other configurations of the storage medium 210, electrodes 220, 230, and emitters 240 are also possible, as will become apparent to one skilled in the art upon using the data storage devices 20 discussed herein.

The emitters 240 may be supported by a micromover 250 that moves the emitters 240 relative to the storage medium 210. In alternate embodiments, the emitters 240 may be attached to a fixed structure while the micromover 250 supports the data storage medium 210 and moves the data storage medium 210 relative to the emitters 240. From the use of the data storage devices 20 discussed herein, other means for moving the emitters 240 relative to the data storage medium 210 will become apparent on one skilled in the art and are also within the scope of the devices and methods discussed herein.

As shown in FIGS. 2 and 3, representative electronic components 260 may be electrically connected to the first electrode 220 and the second electrode 230. These electronic components 260 may include any components that can control and/or measure the voltage and/or the current across the electrodes 220, 230.

According to certain embodiments of these data storage devices, the first electrode 220 and the second electrode 230 are held at substantially the same electrical potential by the electronic components. When the electrodes 220, 230 are held at substantially the same potential, substantially equal amounts of current flow through the first electrode 220 and the second electrode 230 when an emitter 240 bombards an unwritten portion of the organic material 200 with electrons that come to rest with a depth distribution with equal weights above and below the center of the organic material 200. Equal weighting is not required for reading, however, as long as the ratio of currents in both electrodes is constant for uniform material. This will be discussed further in the discussion of how data bits are read from the data storage medium 210.

Though illustrated in FIGS. 2 and 3 as being proximate to the storage medium 210, the emitters 240 discussed above may be positioned at any distance that allows for an energy beam emitted from a particular emitter 240 to interact with only a desired region of the data storage medium 210. According to certain embodiments, the emitters 240 are positioned within a few microns of the data storage medium 210. According to other embodiments, the emitters 240 are in direct contact with the storage medium 210. To help focus in on a desired region, beam optics may optionally be used to allow beams to interact with only micrometer- or sub-micrometer-scaled desired regions of the storage medium 210.

Each of the emitters 240 may include any energy source capable of reading and/or writing data bits to the data storage medium 210 by the methods that will be discussed below. Each of the emitters 240 may, for example, include a device such as, but not limited to, a field emitter (e.g., a silicon field emitter), a Spindt emitter, a thermal emitter, and/or a light emitter.

The organic material 200 included in the data storage medium 210 illustrated in FIGS. 2 and 3 includes a bi-layer Langmuir-Blodgett film. However, in alternate embodiments, the organic material 200 may include a monolayer Langmuir-Blodgett film or may include more than two Langmuir-Blodgett layers. Also, other organic materials such as, but not limited to, conductive polymers and 1-D cathodoconductors, may be used as part of or as the entire organic material 200.

Langmuir-Blodgett films are typically defined as mechanically assembled arrays of amphiphillic molecules. Most commonly, Langmuir-Blodgett films are formed by compressing amphiphillic molecules at the surface of an aqueous environment in order to promote assembling of the molecules into an ordered, periodic structure. Then, the assembled amphiphillic molecules may be transferred to a solid surface, such as one of the electrodes 220, 230 discussed above.

The molecules illustrated in the monolayers of the Langmuir-Blodgett film illustrated in FIGS. 2 and 3 include tail regions 205 that are attached to head groups 207. The tail regions 205 may be either polar or non-polar and are typically made up of one or more carbon chains, though other elements may also make up the chains, as understood to those skilled in the art. The head groups 207 may also be either polar or non-polar and may be positively charged, negatively charged, or electrically neutral.

At least when Langmuir-Blodgett films are included in the organic material 200, predominantly one-dimensional electrical conductivity becomes possible between the first electrode 220 and the second electrode 230. Referring to FIG. 2, one-dimensional conductivity occurs when electrons traveling from the electronic components 260 and through the first electrode 220 are "channeled" through the tail group 205 of a molecule that is adjacent to the first electrode 220. In other words, one-dimensional conductivity occurs if there is a tendency for electrons to travel toward the second electrode 230 along the direction of the tail group 205 and if these electrons do not tend to "jump" to tail groups 205 of adjacent molecules on the first electrode 220. Similarly, one-dimensional conductivity may also occur when electrons travel from the second electrode 230 to the first electrode 220.

In FIG. 2, the one-dimensional conductivity path length may be extended if, after being channeled by the tail group 205 of a molecule adjacent to the first electrode 220, the electrons are subsequently "channeled" by the tail group 205 of a molecule that is adjacent to the second electrode 230. When more Langmuir-Blodgett layers are present, the one-dimensional conductivity path length may be extended further if the tail groups 205 of molecules in additional Langmuir-Blodgett layers also channel electrons.

The electrodes 220, 230 discussed above may include any conductive material such as, but not limited to, refractory metals. When the second electrode 230 is positioned between the organic material 200 and the emitters 240, it is often preferable that the second electrode 230 is made of a material having a long penetration depth for low energy electrons. Such materials generally have a low atomic number or a low mass density. Materials having a long penetration depth for low energy electrons would facilitate the travel of electrons from the emitters 240 to the organic material 200 when the emitters 240 are emitting electron beams.

Though thicker electrodes 220, 230 may be used, a very thin film may be used as the second electrode 230 in order to further facilitate the travel of electrons from an emitter 240 through the second electrode 230. For example, a film with a thickness on the order of 100 nanometers or 10 nanometers or less may be used.

Figure 4:
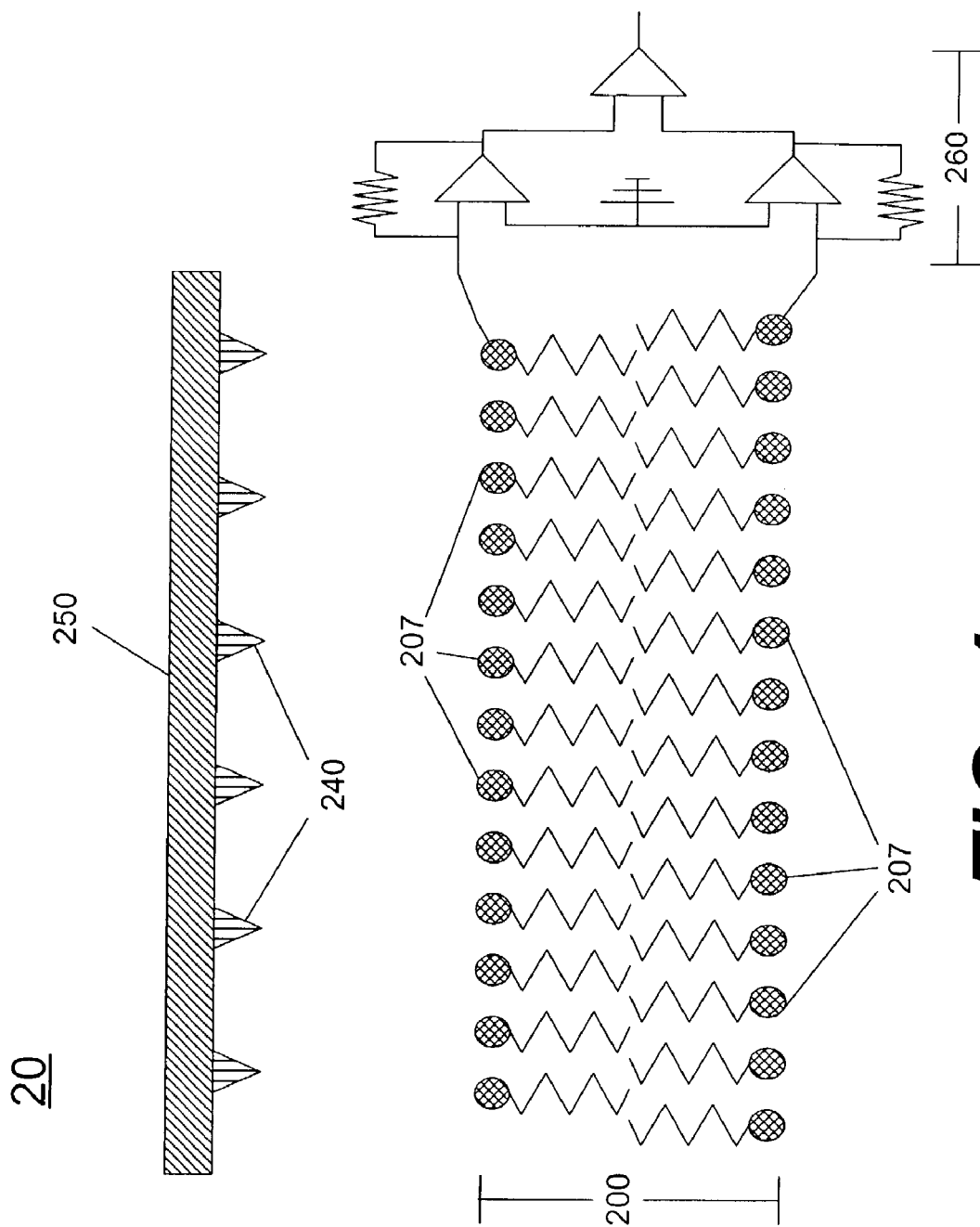
FIG. 4 is a cross-sectional view of an ultra-high density data storage device that includes an organic material in the storage medium which provides the function of signal electrodes as well as storage material.

According to certain embodiments, such as those illustrated in FIG. 4, the electrodes 220, 230 may be so thin as to be made up only of the head groups 207 of the molecules of a Langmuir-Blodgett layer. In such embodiments, the head groups 207 are typically facing outward from the center of the organic material 200. Though Such structures are fragile, travel of beam electrons into the organic material 200 from the emitters 240 is even further facilitated.

In operation, as has been mentioned above, the data storage devices can write data bits to the data storage medium 210 and can read data bits from the data storage medium 210. Both the writing process and the reading process are discussed below.

Writing to the data storage medium 210 may be performed by bombarding the data storage medium 210 with one or more relatively high-energy-density beams (e.g., electron beams, light beams, or thermal radiation) from one or more emitter 240. The bombardment may occur in sub-micrometer-scaled regions (e.g., in regions that have dimensions between approximately 1 and approximately 500 nanometers), in micrometer-scaled regions (e.g., in regions that have dimensions between approximately 0.5 and approximately 100 micrometers), or in larger regions of the organic material 200. Emitters 240 may be selected individually to write to the data storage medium 210 or a set of emitters 240 may write data bits simultaneously.

When one or more emitters 240 bombard a Langmuir-Blodgett film, such as the one illustrated in FIG. 2, the physical changes experienced by the Langmuir-Blodgett film may be represented as shown in FIG. 3. Namely, bonds in the tail groups 205 may be broken by the high-energy-density beams (e.g., by thermal radiation or by electron or photon beams), at least some of the broken, dangling bonds may form new bonds, thereby effectively polymerizing a localized portion of the organic material 200. Alternatively, the head groups 207 may decompose or be severed from the tail groups 205. The ordered structure or phase in FIG. 2 may be replaced with the disordered, partially polymerized structure or phase in FIG. 3 in a localized region of the organic material 200.

When storing data, the ordered, unwritten structure shown in FIG. 2 may be thought of as a "0" data bit. The disordered, written structure shown in FIG. 3 may be thought of as a "1" data bit. In the alternative, high-energy-density beams may be used to transform a disordered structure into an ordered structure. One possibility is that the transformation can be accomplished by applying an electric field to the structure. For example, by biasing the electrodes 220 and 230 relative to each other while locally heating a disordered region with the beam, some polar molecules may align with the field at an appropriate temperature. Under such circumstances, the disordered structure may be thought of as a "0" data bit and the ordered structure as a "1" data bit. Materials that can not easily be restored to an ordered state after being locally driven into a disordered state can still be used for creating a "write once", non-erasable version of this data storage device.

The disordered film structure of FIG. 3 is generally highly localized in only the volumes of the organic material 200 that have been bombarded with high-energy-density beams. In other words, the disordered structure does not appear throughout the organic material 200, but rather appears only in the areas where a high-energy-density beam has caused bonds to break and/or to polymerize with adjacent broken bonds. This localized disorder may also be seen in other organic material 200 (e.g., conductive polymers) after being bombarded with high energy-density beams. Preferably, a material is used in which disorder is caused only when either the local induced temperature or the energy of individual beam particles is over some threshold value. Otherwise, cumulative, unwanted changes may be induced in the storage material during the read process. If a material with a temperature threshold is utilized, then a low power density beam that does not heat the material beyond this threshold can be used for reading. If a material in which particles with more than a certain energy cause disorder (e.g., by breaking or polymerizing bonds) then a beam containing particles with energies below this threshold can be used for reading.

Localized portions or volumes of disorder (i.e., written data bits) typically have different conductivities than adjacent ordered, non-polymerized portions (i.e., unwritten data bits). In addition, disordered, polymerized portions generally lose the predominantly one-dimensional conductivity found in some anisotropic ordered structures. Hence, the disordered and/or polymerized portions may be detected via a number of methods, as discussed below.

Reading from the storage medium 210 may be performed by bombarding the storage medium 210 with a relatively low-energy-density beam (preferably an electron beam) from the emitter 240. The low-energy-density beam does not cause a temperature rise capable of altering the storage medium significantly. Moreover, particles in the low-energy-density beam all have low enough energies so that they do not alter the storage medium (e.g. by breaking or polymerizing bonds) significantly. Accordingly, exposing to the low-energy-density reading beam will not alter the data storage medium 210. The structure or phase of the organic material 200 remains the same before and after being bombarded by the low-energy-density beam.

When reading from the data storage medium 210, the first electrode 220 and the second electrode 230 may be held at substantially the same electrical potential. This will help to minimize unwanted leakage currents between the electrodes that could make it more difficult to monitor the signal currents induced by the read beam. By holding the electrodes 220, 230 at substantially the same potential, a substantially equal amount of current flows through each electrode 220, 230 when (1) the emitter 240 bombards the organic material 200 with electrons that come to rest with a depth distribution having equal weights above and below the center of the organic material 200, and (2) the storage medium 210 has not been written to. This condition, where substantially equal currents flow through each electrode, makes it convenient to recognize where the data storage medium 210 has not been written to. In written regions, where the resistivity has been altered asymmetrically with respect to the center plane of the storage layer, it will no longer be true that electrons that come to rest in the top half of the layer will flow to the top electrode. If, for example, the resistivity is locally increased in a portion of the top half of the film then a greater portion of the read current will flow to the bottom electrode when the beam is incident over this region. Hence, when bombarding the data storage medium 210 at different locations, "0" data bits may be read when substantially equal currents are detected in each electrode 220, 230 and "1" data bits may be read when the currents are unequal.

Since the local disorder of the organic material 200 typically alters the local resistivity of a region of the organic material 200, an alternate method of reading data bits from the data storage medium 210 may include monitoring a first current of a first magnitude in the first electrode 220, monitoring a second current of a second magnitude in the second electrode 230, and comparing the first magnitude to the second magnitude as the emitters 240 move relative to the data storage medium 210. This reading method does not require that the bombarding electrons come to rest with a depth distribution having equal weights above and below the center of the organic material 200, though a substantially constant distribution of the depth of bombardment reduces signal noise.

The distribution of the depths of bombardment is determined by the initial energy of the electrons and the properties of the organic material 200. In general, when the storage medium 210 is bombarded by the emitters 240, more electrons will come to rest in the top half of the storage medium 210 than in the bottom half of the storage medium 210 (unless a fairly high beam energy is used). Thus, even in the unwritten regions, more current will be collected on the top electrode 230. For this reason, at least in some cases, it may be advantageous to simply monitor the current collected on the bottom electrode 220 or to monitor the difference between the two electrode currents.

When a Langmuir-Blodgett film, or other material that allows for the possibility of a highly anisotropic electrical conductivity, is included in the organic material 200, crosstalk between bits can be minimized. If there is appreciable conductivity in the plane of the data storage medium 210, and if a bit is interrogated by a reading electronic beam, then some of the electrons introduced to the data storage medium 210 can travel laterally and then up or down through neighboring bits to the electrode 230 or 220. Thus, neighboring bits can influence the signal produced by the reading electronic beam when the beam impinges on a given bit. A true 1-D conductor would prevent this interference and make it easier to pack the bits tightly without bits interfering with each other.

As another alternative, reading of data bits that are stored in the Langmuir-Blodgett film may be done by causing and monitoring resonance effects in the Langmuir-Blodgett film. In case of writing, if there is a specific incident electron energy at which bond breakage is affected, irradiating with electrons just above that energy for writing and below that energy for reading increases the margins between writing and reading.

Figure 5:
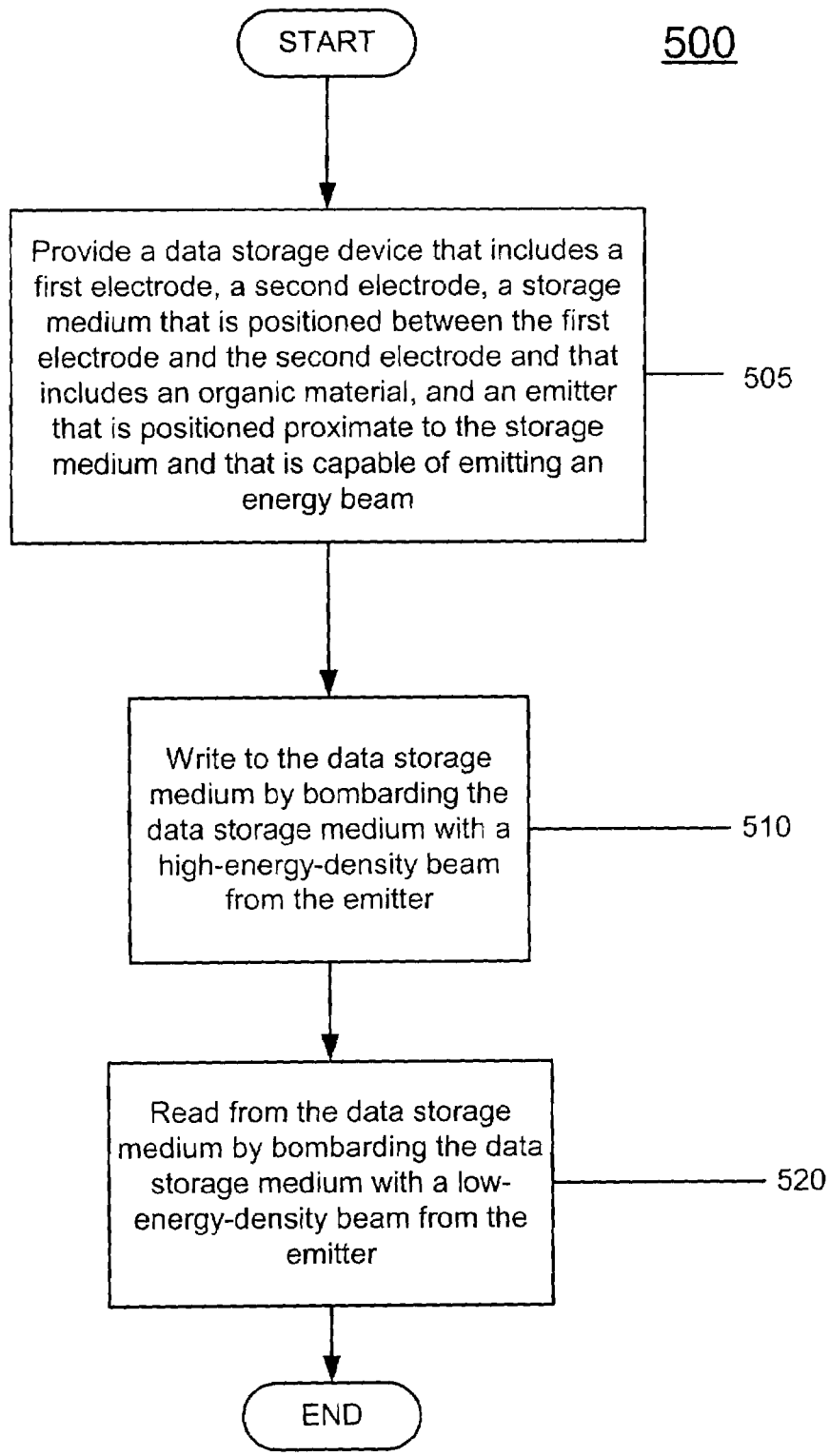
FIG. 5 is a flowchart of an exemplary method of storing and retrieving data in a data storage device.

FIG. 5 is a flowchart showing an exemplary method 500 of storing and retrieving data in a data storage device. According to certain embodiments, step 505 of the exemplary method provides a data storage device that includes a first electrode, a second electrode, a storage medium that is positioned between the first electrode and the second electrode and that includes an organic material, and an emitter that is positioned proximate to the storage medium and that is capable of emitting an energy beam with, at most, a micrometer-scaled spot size on a surface of the storage medium.

Step 510 of the exemplary method specifies writing to the storage medium by bombarding the storage medium with a high-energy-density beam from the emitter. Step 520 of the exemplary method then specifies reading from the storage medium by bombarding the storage medium with a low-energy-density beam from the emitter.

According to certain embodiments, step 510 can include bombarding a sub-micrometer-scaled region of the organic material with the high-energy-density beam from the emitter. Also, step 510 can include altering the localized resistivity of a region of the organic material. Further, step 510 can include locally altering the structure of a Langmuir-Blodgett film included in the organic material. Even further, step 510 can include locally breaking molecular bonds in the Langmuir-Blodgett film to form dangling bonds and/or polymerizing at least some of the dangling bonds.

According to certain embodiments, step 520 may include monitoring a current in one of the electrodes, or monitoring currents in both electrodes and comparing the magnitude of the currents. Also, step 520 may include using a Langmuir-Blodgett film in the storage medium to promote one-dimensional conductivity between the first electrode and the second electrode. Further, step 520 may include causing resonance effects in the Langmuir-Blodgett film to increase the signal-to-noise while reading from the storage medium. As noted, step 510 may include bombarding the storage medium with a high-energy-density electron beam and step 520 may include bombarding the storage medium with a low-energy-density electron beam.

The foregoing detailed description has been given for understanding exemplary implementations of the invention only and no unnecessary limitations should be understood therefrom as modifications will be obvious to those skilled in the art without departing from the scope of the appended claims and their equivalents.

The invention claimed is:

1. A data storage device comprising: a first electrode and a second electrode; a storage medium positioned between the first electrode and the second electrode, wherein the storage medium comprises an organic material; and an electron beam emitter positioned proximate to the storage medium but not in contact with the storage medium.

2. The device of claim 1, wherein the first electrode is positioned between the storage medium and the emitter.

3. The device of claim 2, wherein the first electrode comprises a material having a long penetration depth for low energy electrons.

4. The device of claim 1, wherein the first electrode comprises a refractory metal.

5. The device of claim 1, wherein the emitter is capable of emitting an energy beam with a sub-micrometer-scaled spot size.

6. The device of claim 5, wherein the emitter is capable of emitting the energy beam with a nanometer-scaled spot size.

7. The device of claim 1, wherein the organic material comprises a Langmuir-Blodgett film.

8. The device of claim 1, wherein the storage medium allows for a highly anisotropic electrical conductivity between the first electrode and the second electrode, wherein said highly anisotropic electrical conductivity has a higher conductivity.

9. A data storage device comprising: a first electrode and a second electrode; a storage medium including organic material positioned between the first electrode and the second electrode; an electron beam emitter positioned proximate to the storage medium; and means for holding the first electrode and the second electrode at substantially the same electrical potential.

10. A data storage device comprising a first electrode and a second electrode; a storage medium including an organic bi-layer between the first electrode and the second electrode; and an electron beam emitter positioned proximate to the storage medium.

11. A data storage device comprising a first electrode and a second electrode; a storage medium including a layer having an organized structure with uniaxial conductivity, the layer between the first electrode and the second electrode; and an electron beam emitter positioned proximate to the storage medium; wherein the first electrode comprises a polar group from a molecule making up the layer.

12. A method of storing and retrieving data in a data storage device, that includes a first electrode; a second electrode; and a storage medium comprising an organic material, positioned between the first electrode and the second electode; the method comprising writing to the storage medium without contacting the storage medium by bombarding the storage medium with a high-energy electron beam; and reading from the storage medium without contacting the storage medium by bombarding the storage medium with a low-energy electron beam.

13. The method of claim 12, wherein the writing step comprises bombarding a nanometer-scaled region of the organic material with the high energy electron beam.

14. The method of claim 12, wherein the writing step comprises altering the localized resistivity of a region of the organic material.

15. The method of claim 12, wherein the reading step comprises the step of monitoring a current in one of the first electrode and the second electrode.

16. The method of claim 12, wherein the writing step comprises locally altering the structure of a Langmuir-Blodgett film included in the organic material.

17. The method of claim 12, wherein the writing comprises locally breaking molecular bonds in an anisotropic film to form dangling bonds.

18. The method of claim 12, wherein the electron beam is used to polymerize or break bonds in local regions of the film during write operations, whereby write-once operations are performed.

19. The method of claim 16, wherein the reading step comprises using the Langmuir-Blodgett film to promote one-dimensional conductivity between the first electrode and the second electrode.

20. The method of claim 16, wherein the reading step comprises causing resonance effects in the Langmuir-Blodgett film.

21. A method of storing and retrieving data in a data storage device that includes a first electrode; a second electrode; and a storage medium comprising an organic material, positioned between the first electrode and the second electrode the method comprising writing to the storage medium by bombarding the storage medium with a high-energy electron beam and reading from the storage medium by bombarding the storage medium with a low-energy electron beam, the writing and reading performed while holding the first electrode and the second electrode at substantially the same electrical potential.

22. A method of storing and retrieving data in a data storage device that includes a first electrode; a second electrode; and a storage medium comprising an organic material, positioned between the first electrode and the second electrode the method comprising writing to the storage medium by bombarding the storage medium with a high-energy electron beam; and reading from the storage medium by bombarding the storage medium with a low-energy electron beam, monitoring a first current of a first magnitude in the first electrode; monitoring a second current of a second magnitude in the second electrode; and comparing the first magnitude to the second magnitude as the electron beam is moved relative to the storage medium.

* * * * *